United States Patent [19]

Astle et al.

[11] 4,207,786
[45] Jun. 17, 1980

[54] CAM FOLLOWER TOOL ARRANGEMENT

[75] Inventors: William H. Astle, Rancho Cordova; John E. Pertle, Garden Valley, both of Calif.

[73] Assignee: Tri Tool, Inc., Placerville, Calif.

[21] Appl. No.: 921,520

[22] Filed: Jul. 3, 1978

[51] Int. Cl.² ............................................. B23B 3/22
[52] U.S. Cl. ..................................................... 82/4 C
[58] Field of Search .......................................... 82/4 C

[56] References Cited

U.S. PATENT DOCUMENTS

| | | | |
|---|---|---|---|
| 3,164,062 | 1/1965 | Hogden et al. | 82/4 C |
| 3,608,406 | 9/1971 | Paysinger et al. | 82/4 C |
| 3,613,320 | 10/1971 | Mighton | 82/4 C |
| 3,699,828 | 10/1972 | Platek et al. | 82/4 C |
| 3,744,356 | 7/1973 | Slator et al. | 82/4 C |
| 3,813,968 | 6/1974 | Thomas | 82/4 C |
| 3,927,584 | 12/1975 | Mayfield | 82/4 C |

FOREIGN PATENT DOCUMENTS 666894  2/1952  United Kingdom ..................... 82/4 C

*Primary Examiner*—Harrison L. Hinson
*Attorney, Agent, or Firm*—Don B. Finkelstein

[57] ABSTRACT

A pipe bevelling tool arrangement for providing a predetermined bevel on the end surface of a pipe. The arrangement described herein provides an orbital cam follower bevelling tool that provides a constant bevel leaving a radially extending land on the end surface of a pipe having a predetermined minimal radial extent regardless of the "out-of-round" condition of the pipe. A cam is mounted to engage the exterior surface of the pipe and a bevelling tool is rigidly coupled to the cam and the cam and bevelling tool orbit around the nominal center line of the pipe. The cam and the pipe bevelling tool are resiliently mounted on a rigid arm rotating about the nominal center line of the pipe and the pipe bevelling tool follows movement of the cam in a radial direction. The pipe bevelling tool is set in a preselected position with respect to the cam to provide the desired bevel portion and extent of the radially extending portion on the end surface of the pipe.

10 Claims, 13 Drawing Figures

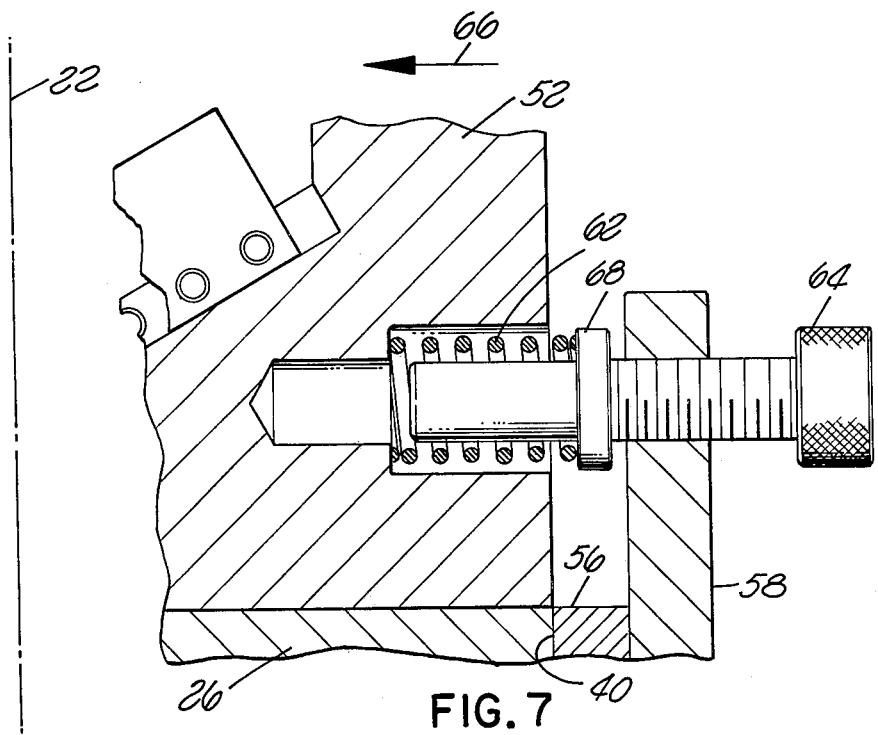
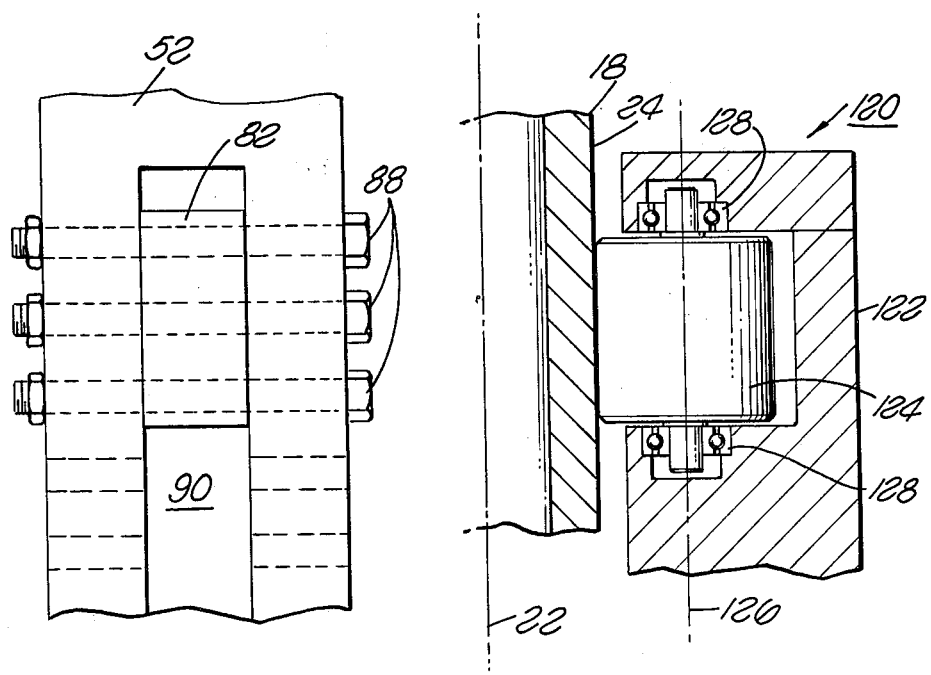

ure of the pipe will vary in radial distance from the nominal center line of the pipe depending upon how out-of-round the pipe may be. Further, and as hereinafter explained, it will be appreciated that the present invention is not restricted to providing bevelling of the end surface of only an out-of-round pipe. It may equally well be utilized to provide a bevel on the end surface of a perfectly round pipe.

CAM FOLLOWER TOOL ARRANGEMENT

BACKGROUND OF THE INVENTION

1. Field of the Invention

This invention relates to the pipe end surface bevelling art and more particularly to a cam following pipe bevelling tool arrangement adapted to follow the contours of the external surface of a pipe to be bevelled.

2. Background of the Invention

In many applications it is necessary to prepare properly the end surface of a pipe. For example, pipe sections are often joined together by welding and, as such, the end surface of each pipe section must be properly prepared. One step in the preparation is the cutting of a land or flat on the end surface of the pipe lying in a plane perpendicular to the center line of the pipe. The flat provided on the end surface extends from the inside diameter of the pipe radially outwardly a predetermined distance and a bevel extending from the end of the flat to the external surface of the pipe may also be required. When two such properly prepared end surfaces of pipes are placed adjacent they may be welded in the resulting V-shaped groove formed by the two bevelled surfaces.

In many applications, however, it has been found that the pipe sections, while generally of a constant wall thickness may be out-of-round. That is, often times in the field, such pipe sections are stored in a vertically stacked arrangement. The weight of such pipe section bearing upon those in the lower layers often causes a deformation of the pipe to an out-of-round condition. Consequently, such pipe sections have a nominal center line and the internal and external surfaces of the pipe vary in the radial dimension from this nominal center line. However, it is still desired to provide even in such out-of-round pipe sections the constant land and bevel in the end surfaces thereof.

Prior art devices for preparation of the end surfaces of pipe sections have generally comprised various types of tools which may be coupled to or placed adjacent to the end surface of the pipe and rotated about the center line, or nominal center line of the pipe at a fixed radial distance thereof with the tool position and/or shape providing the desired configuration of the cut made in the end surface of the pipe. Rotating at a fixed radial distance, therefore, a constant configuration of the end surface could not be obtained on out-of-round pipe due to the radial distance variation of the pipe walls from the nominal center line thereof.

Consequently, there has long been a need for a pipe end surface bevelling tool arrangement which can provide a constant bevel on the end surface of a pipe despite the out-of-round condition of the pipe.

SUMMARY OF THE INVENTION

It is an object of the present invention to provide an improved pipe end surface bevelling tool arrangement.

It is another object of the present invention to provide an improved pipe end surface bevelling tool arrangement capable of providing a constant bevel in the end surface of a pipe.

It is yet another object of the present invention to provide an improved pipe end surface bevelling tool arrangement for machining a constant bevel for the end surface of a pipe despite the out-of-round condition of the pipe.

The above and other objects of the present invention are achieved, according to the preferred embodiment thereof by providing a pipe bevelling tool arrangement including a mandrel means for detachable rigid engagement with the interior walls of the pipe whose end surface is to be prepared. The preparation of the end surface of the pipe may include both the machining of a flat lying in a plane perpendicular to the axis or nominal axis of the pipe as well as a bevel extending outwardly to the fixture end wall of the pipe from the flat. A rigid arm means is rotatably mounted on the mandrel and extends radially outwardly therefrom. The rigid arm means rotates about the center line or nominal center line of the pipe and moves axially during cutting of the pipe end surface. It will be appreciated, of course, that for a pipe that is round, the actual center line and the nominal center line are coincident. However, in those applications where the pipe is out-of-round the nominal center line, as utilized herein, is defined as the center line of the pipe if the pipe were round. Thus, the interior and exterior wall surfaces of the pipe will vary in radial distance from the nominal center line of the pipe depending upon how out-of-round the pipe may be. Further, and as hereinafter explained, it will be appreciated that the present invention is not restricted to providing bevelling of the end surface of only an out-of-round pipe. It may equally well be utilized to provide a bevel on the end surface of a perfectly round pipe.

Motion producing means such as an electric motor, pneumatic motor or hydraulic motor and appropriate controls are provided for rotating the rigid arm means about the nominal center line of the pipe as well as providing axial movement thereof. A support means is slidably mounted on the rigid arm means and adapted to move radially therealong toward and away from the nominal center line of the pipe. A first resilient means, which for example may be a spring, is positioned intermediate the support means and the rigid arm means for yieldingly urging the support means radially inwardly toward the nominal center line of the pipe with a first predetermined resilient force.

A cam means is mounted on the support means and moves therewith in the radial movement of the support means. The cam means has a bearing surface engaging the exterior surface of the pipe and the first resilient means continually urges the bearing surface of the cam means into engagement with the exterior surface of the pipe during the rotation of the rigid arm means about the nominal center line of the pipe and during the axial movement thereof.

A bevel cutter tool means is rigidly coupled to the support means and moves in the radial movement therewith toward and away from the nominal center line of the pipe. The bevel cutter tool means has a tool bit with a pipe cutting edge for engagement with the end surface of the pipe for cutting the bevel therein at a predetermined angle.

As the rigid arm means rotates about the nominal center line of the pipe and moves axially at a predetermined feed rate, the cam means continually engages the exterior surface of the pipe and, therefore, the bevel cutter tool means moves radially inwardly and outwardly a distance as determined by the radial movement of the cam means following the contour of the exterior surface of the pipe. For the condition of the pipe being out-of-round, the pipe cutting edge of the tool bit of the bevel cutter tool means is thus moved radially toward and away from the nominal center line of the pipe an exact amount determined by the amount of out-of-round condition of the pipe as sensed by the cam means. The first resilient means also provides the necessary force for maintaining the pipe cutting edge of the bevel cutter tool means in pipe cutting relationship to the end surface of the pipe.

BRIEF DESCRIPTION OF THE DRAWINGS

The above and other objects of the present invention may be more fully understood from the following detailed description taken together with the accompanying drawings wherein similar reference characters refer to similar elements throughout and in which:

FIG. 7 is a sectional view along the line 7—7 of FIG. 5;

FIG. 8 is a view along the line 8—8 of FIG. 6;

FIG. 9 illustrates another embodiment of the present invention;

DESCRIPTION OF THE PREFERRED EMBODIMENTS

Figure 1:
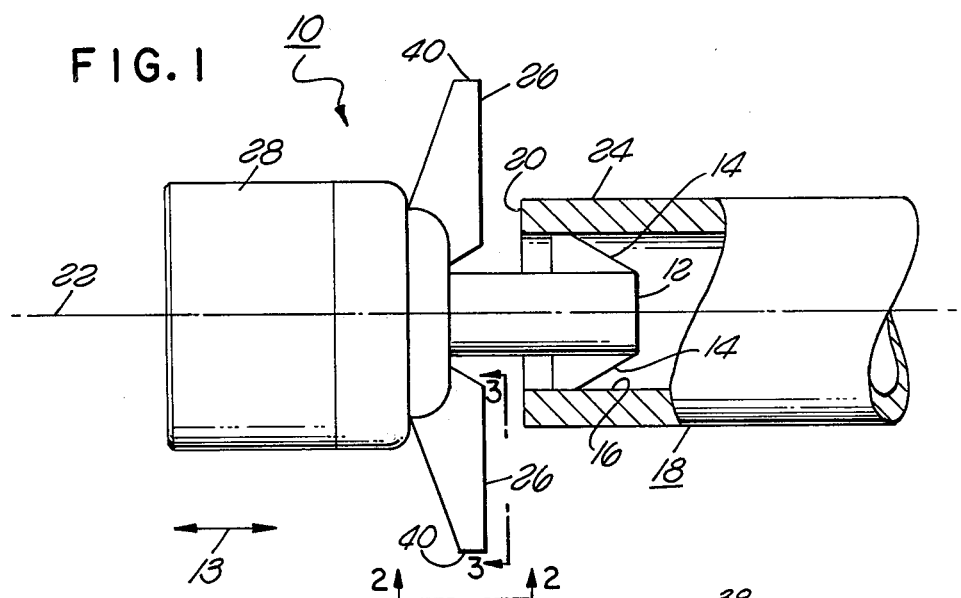
FIG. 1 illustrates the tool arrangement useful in the practice of the present invention.

Referring now to FIG. 1 there is illustrated a tool arrangement generally designated 10 useful with the present invention. The tool arrangement 10 comprises a mandrel 12 having a plurality of circumferentially spaced portions or blades 14 adapted to detachably but rigidly engage the interior surface 16 of the pipe 18. The pipe 18 has an end surface 20 which is to be machined. Pipe 18 has a nominal center line 22. For the condition of the pipe 18 being round the nominal center line 22 corresponds to the center line of the pipe 18 and, with a constant wall thickness, the interior surface 16 of the pipe 18 and the exterior surface 24 of the pipe 18 are at a constant distance from the center line 22. However, for the condition of the pipe 18 being out-of-round, the distance of the interior surface 16 and exterior surface 24 of the pipe 18 from the nominal center line 22 will vary. The blades 14 of the mandrel 12 are adapted to rigidly engage the interior surface 16 of the pipe 18 so that the center line of the mandrel 12 corresponds with the nominal center line 22 of the pipe 18 despite any out-of-round condition thereof. The tool arrangement 10, therefore, may for example be similar to the pipe lathe system model 714 manufactured and sold by Tri Tool, Inc., 4505 Greenstone Road, Placerville, Calif.

The tool arrangement 10 is provided with a plurality of radially extending rigid arm means 26 extending radially outwardly from the nominal center line 22 and the rigid arm means 26 are adapted to rotate about the nominal center line 22. To provide such rotation a power means 28 which, for example, may be electric, pneumatic, or hydraulic, may be provided. It will be appreciated that the details of the structure and configuration of the tool arrangement 10 do not, per se, form the present invention.

Figure 2:
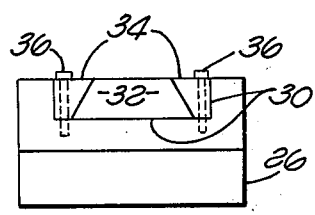
FIG. 2 is a view along the line 2—2 of FIG. 1.
Figure 3:
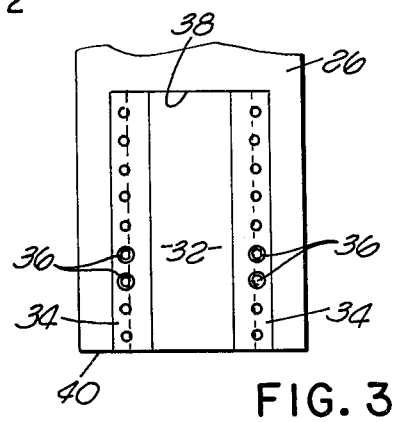
FIG. 3 is a view along the line 3—3 of FIG. 1.

Referring to FIG. 2, which is a view along the line 2—2 of FIG. 1, it can be seen that the rigid arms 26 are provided with walls 30 defining a slot 32 therein and gibs or rails 34 may also be provided for detachably bolting by means of, for example, bolts 36 in the cavity 32. FIG. 3, which is a view along the line 3—3 of FIG. 1 illustrates the arm 26 and shows that the extent of the cavity 32 does not extend the full radial length of the arms 36 but is provided with an end wall 38 spaced a predetermined distance from the outer end 40 of the arm 26. The pipe bevelling tool arrangement of the present invention is adapted to fit in the cavity 32 for rotation with the rigid arm 26 about the nominal center line 22 as described below in greater detail.

Figure 4:
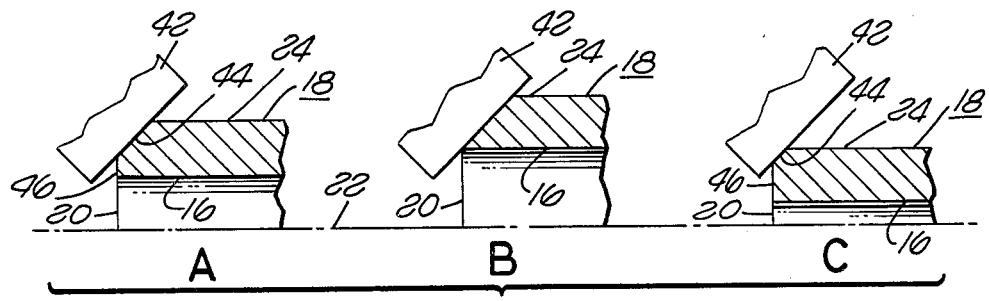
FIGS. 4A, 4B and 4C illustrate bevelling of an end surface of a pipe for the condition of the pipe in an out-of-round configuration.

Referring now to FIGS. 4A, 4B and 4C, there is illustrated thereon the variations that may occur in the bevelling of the end surface 20 of a pipe 18 for the condition of the pipe 18 in an out-of-round configuration. Thus, FIG. 4A shows a bevelling tool 42 providing a bevelled surface 44 on the end surface 20 of the pipe 18 which bevelled surface 44 extends from the radially extending flat portion 46 of the end surface 20 of the pipe 18. In prior art applications, the bevel cutting tool 42 was maintained at a fixed radial distance from the nominal center line 22. For the condition of the pipe 18 being in round, the radially extending flat 46 and bevelled surface 44 on the end surface 20 of the pipe 18 were maintained in the desired configuration shown in FIG. 4A as the bevel cutting bit 42 rotates around the nominal center line 22. However, as illustrated in FIG. 4B when the pipe 18 is out-of-round and, at a given point in the circumference has an interior and exterior diameter greater than the nominal diameter shown in FIG. 4A, the flat or land portion 46 on the end surface 20 may be completely eliminated during the rotation of the bevel cutting tool bit 42 around the nominal center line 22 since it is maintained at a fixed radial distance therefrom. Similarly, as shown in FIG. 4C if at a particular circumferential position on the pipe 18 the diameter of the interior wall 16 and exterior wall 24 is less than the nominal diameter as shown in FIG. 4A the land portion 46 has a much greater extent and the bevelled surface 44 a much smaller extent than desired.

The machining of the land portion 46 on the end surface 20 of the pipe 18 may be accomplished by a radially fixed cutter since variations in the diameter will not affect the provision of such surface and the tool arrangement 10 can incorporate an appropriate tool for cutting the end surface 20 of the pipe 18 in a plane perpendicular to the nominal center line 22. After such surface has been cut, the bevelled portion 44 may be machined onto the end surface 20 of the pipe 18 and, according to the principles of the present invention, a constant bevel leaving a constant flat land is provided despite the out-of-round condition of the pipe 18.

Figure 5:
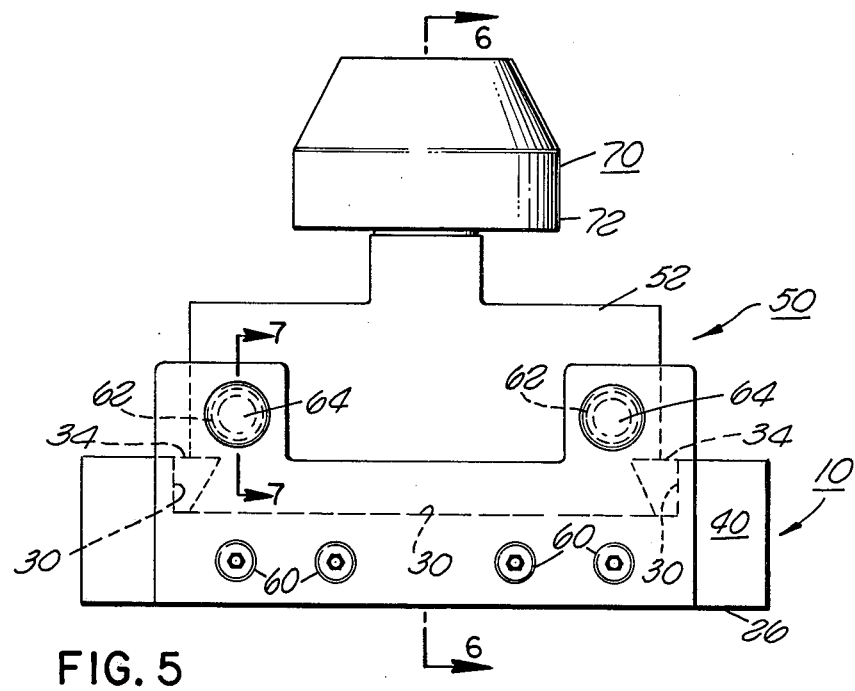
FIG. 5 is an end view of a pipe bevelling tool arrangement according to the principles of the present invention.
Figure 6:
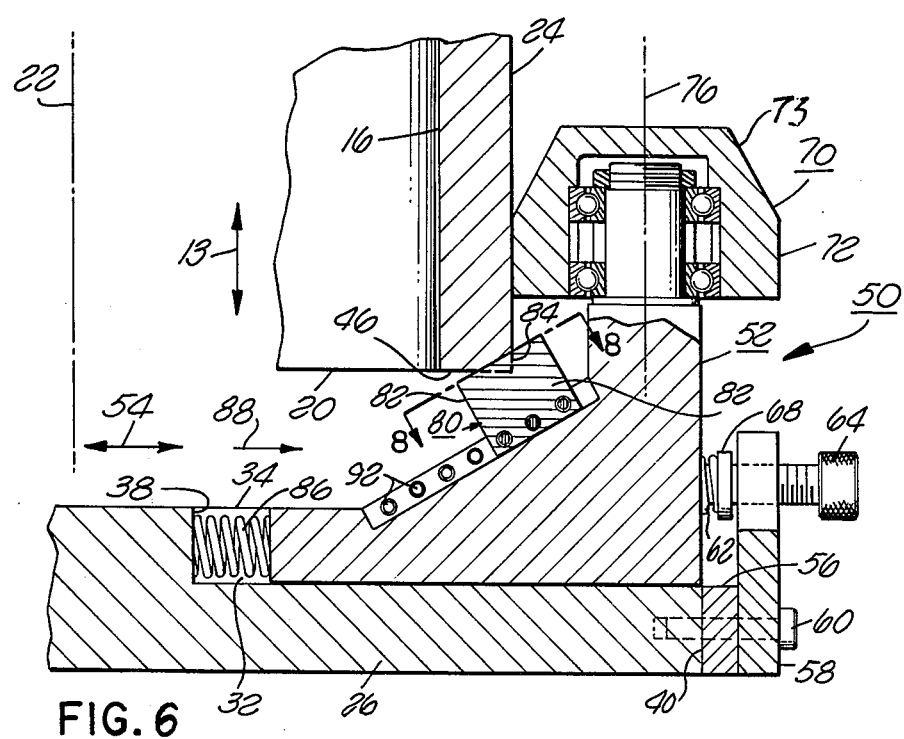
FIG. 6 is a sectional view along the line 6—6 of FIG. 5.

Referring now to FIG. 5 there is illustrated an end view similar to the view shown in FIG. 2 of one of the rigid arms 26 in which the pipe bevelling tool arrangement of the present invention, generally designated 50 is installed. FIG. 6 is a sectional view along the line 6—6 of FIG. 5. FIG. 7 is a sectional view along the lines 7—7 of FIG. 5 and FIG. 8 is a view along the line 8—8 of FIG. 6, all of which illustrate the various features of the embodiment 50. Referring to FIGS. 5, 6, 7 and 8, the pipe bevelling tool arrangement embodiment 50 mounted on one of the rigid arms 26 is provided with a support means generally designated 52 slidably mounted in the cavity 32 of the rigid arm 26 and engaging the rails or gibs 34 for retention therein. The support means 52 is slidably movable in the cavity 32 of the rigid arm means 26 in radial directions as indicated by the double ended arrow 54 toward and away from the nominal center line 22 of the pipe means 18 whose end surface 20 is to be bevelled to provide a bevelled portion 44 therein adjacent to the radially extending land 46 thereon. A spacer plate 56 and a bracket 58 are coupled to the end surface 40 of the rigid arm 26 by for example a plurality of bolt means 60 extending through the bracket 58, spacer 56 and into the rigid arm means 26. Thus, the spacer 56 and bracket 58 are rigidly fixed to the rigid arm 26. In certain applications more than one spacer plate 56 may be desired while at other applications the spacer plate 56 may be eliminated in accordance with the teachings of the present invention. A first resilient means 62 engages the support means 52 and the rigid arm means 26 by bearing against adjustment means 64 which threadingly engages the bracket means 58 and yieldingly urges the support means 52 radially inwardly as indicated by the arrow 66 toward the nominal center line 22 of the pipe means 18 about which the rigid arm means 26 is rotated. The adjustment means 64 is utilized to vary the predetermined force of the first resilient means 62. Thus, by rotating the adjustment means 64 the shoulder 68 is moved closer or further from the support means 52 thus compressing or allowing expansion of the first resilient means 62 thereby varying the force exerted by the first resilient means 62 in the direction indicated by the arrow 66. Utilization of the spacer plate 56 becomes apparent. By placing one or more spacer plates 56 intermediate the bracket 58 and the end surface 40 of the arm 26 the relative position of the shoulder 68 of adjustment means 64 with respect to the support means 52 for any given position of the adjustment means 64 in the bracket 58 may be varied to achieve greater variations in the first predetermined resilient force exerted by the first resilient means 62 on the support means 52 in the direction of the arrow 66.

A cam means generally designated 70 is mounted on the support means 52 and moves in the radial directions indicated by the double ended arrow 54 therewith. The cam means 70 has a bearing surface 72 adapted to bear against the exterior wall surface 24 of the pipe 18 and be maintained thereagainst by the force exerted by first resilient means 62. In the embodiment 50 the cam means 70 is shown rotatably mounted on bearings 74 for rotation about cam axis 76 which is parallel to the nominal axis 22 of the pipe 18. It will be appreciated, however, that many variations of the particular configuration of the cam means 70 may be utilized including rotating or non-rotating cams. The cam means 70, since it is coupled to the support means 52 moves in the radial direction indicated by the arrow 54 therewith. Thus, the cam means 70 has a bearing surface 72 which is maintained in constant contact with the outer surface 24 of the pipe means 18 during the operation of the pipe bevelling tool arrangement 50 and during the rotation and axial movement thereto.

In order to cut the bevel on the end surface 20 of the pipe 18 indicated at 44, a bevel cutter tool means generally designated 80 having a bevel cutter tool bit 82 is coupled to the support means 52 in a predetermined axial and radial relationship to the cam 70. The bevel cutter tool bit 82 moves in the radial direction as indicated by the double ended arrow 54 with the support means 52 as well as in the axial direction and cuts the end surface 20 of the pipe 18 to provide the bevel portion 44.

As noted above, the tool arrangement 10 shown on FIG. 1 moves the rigid arms 26 in axial directions indicated by the arrow 13 so that the bevel cutter tool bit 82 may be brought into contact with the end surface 20 to cut away the portion indicated on FIG. 6 by the dotted line 84 until the correct bevel adjacent to the land portion 46 is provided.

A second resilient means 86 may be provided intermediate the rigid arm 26 such as at the wall 38 thereof and the support means 52 to act as a damper on the radial movement of the support means 52. The second resilient force exerted by the second resilient means 86 is radially outwardly as indicated by the arrow 88 and against the force exerted by the first resilient means 62 as indicated by the arrow 66. However, the spring constant of the second resilient means 86 is much less than the spring constant of the first resilient means 62 and therefore the second resilient force exerted on the support means 52 is much less than the resilient force exerted by the first resilient means 62.

In the embodiment 50 the bevel cutting tool bit 82 is maintained on the support means 52 by, for example, a plurality of bolts 88 extending therethrough in a slot 90. Additional apertures 92 may be provided to allow adjustment and/or positioning of the bevel cutting tool bit 82 as desired.

Figure 10:
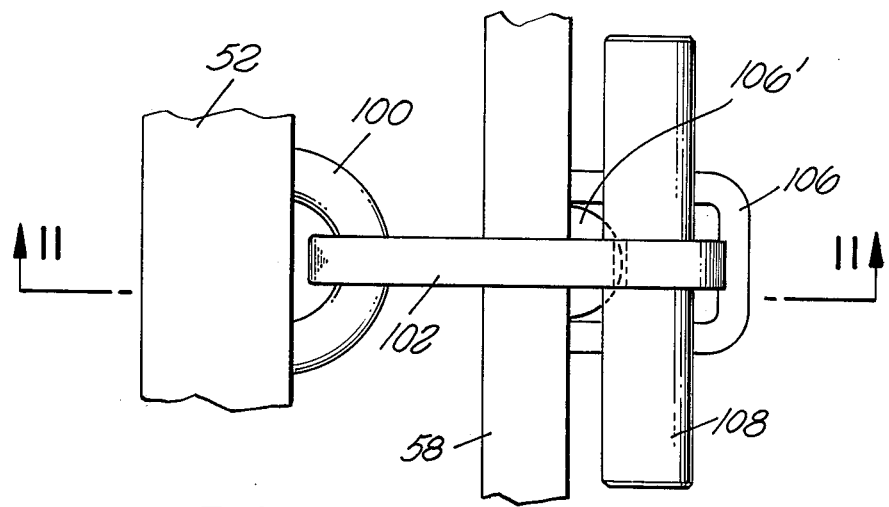
FIGS. 10 and 11 illustrate another embodiment of the present invention.
Figure 11:
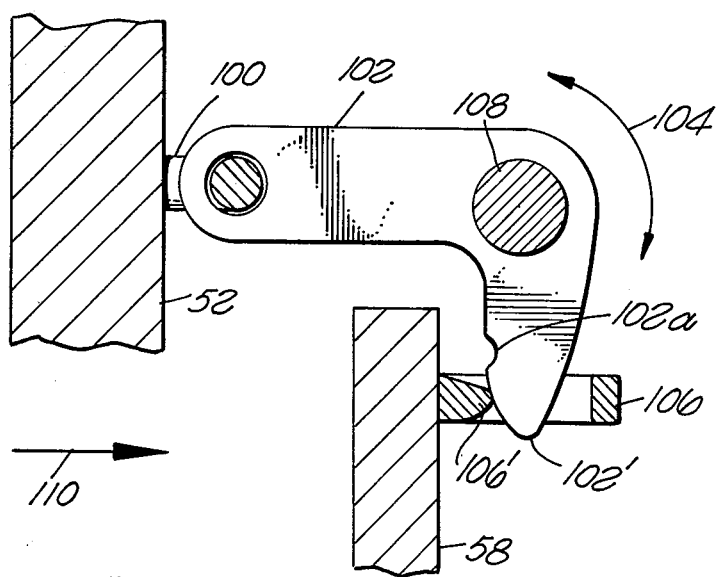

The particular cam means 72 illustrated in FIG. 6 is one arrangement, as noted above, for providing such a cam. Thus, the cam 70 has a right cylindrical bearing surface 72 and a conical portion 73. It has been found that the provision of the conical surface 73 aids in bringing the cam means 70 into engagement with the pipe 18 during axial movement in the directions indicated by the arrow 13. However, in the retraction of the cam 70 from engagement with the external surface 24 of the pipe 18 it has been found that, in certain applications, the bevel portion 44 on the end surface 20 of the pipe 18 may be damaged by engagement with the cam 70. Accordingly, it may be desireable to provide a means selectively moving the cam out of engagement with the exterior surface 24 of the pipe means 18 during retraction. FIGS. 10 and 11 illustrate one arrangement for providing for the disengagement of the cam means 70 from the pipe 18. As shown in FIGS. 10 and 11 a hook eye 100 is coupled to the support means 52 and a lever means 102 is rotatably mounted on the hook eye 100 for rotation in directions indicated by the arrow 104. An engagement means generally designated 106 is coupled to the bracket 58 and the outer portion 102' of the lever 102 engages the means 106. A handle 108 is provided on the lever 102. As the lever 102 is forced against the abutment portion 106' the support means 52 and, consequently, the cam 70 is moved radially outwardly in the direction indicated by the arrow 110 until it is clear of engagement with the pipe 18. A detent 102a may be provided on the lever 102 to restrain the lever 102 when the support means 52 has been moved radially outwardly by engagement with the abutment portion 106' fitting therein.

As noted above, the cam means 70 utilized in the present invention may take many forms. FIG. 9 illustrates an embodiment generally designated 120 provided with a cam means 122 of a different configuration than that shown in FIG. 5. As shown on FIG. 9 the cam means 122 is provided with a hardened steel roller 124 rotating about an axis 126 which is substantially parallel to the nominal pipe axis 22 of a pipe 18 whose end surface (not shown in FIG. 9) is to be bevelled in accordance with the principles of the present invention. The roller 124 is supported in bearings 128 and engages the exterior surface 24 of the pipe 18. Operation of the embodiment 120 may be identical to the operation of the embodiment 50 described above and, if desired, the structural arrangement illustrated in FIGS. 10 and 11 may also be incorporated thereon as desired.

From the above it is apparent that there has been provided an improved tool arrangement for providing the bevel portion on the end surface of a pipe regardless of the out-of-round condition of the pipe. Those skilled in the art may find many variations and adaptations of the present invention and all such variations and adaptations falling within the true scope and spirit of the present invention are intended to be covered by the appended claims.

We claim:

1. In a pipe bevelling tool arrangement of the type in which the pipe having the end surface to be bevelled is stationary and the bevel cutter tool means for bevelling the pipe face orbits around the pipe, the improvement comprising, in combination:

mandrel means for detachably rigid engagement with the interior walls of the pipe;

rigid arm means rotatably mounted on said mandrel means and extending radially outwardly therefrom for rotation on said mandrel means about the nominal center line of said pipe;

motion producing means for rotating said rigid arm means about said nominal center line of said pipe;

support means slidably mountable on said rigid arm means for radial movement with respect thereto toward and away from said nominal center line of said pipe;

first resilient means intermediate said support means and said rigid arm means for yielding urging said support means in a radially inwardly direction toward said nominal center line of said pipe with a first predetermined resilient force;

cam means mounted on said support means and moving in said radial movement with said support means, and said cam means having a bearing surface thereof engaging the exterior surface of said pipe, and said first resilient means urging said bearing surface of said cam means into engagement with said exterior surface of said pipe;

bevel cutter tool means rigidly coupled to said support means moving in said radial movement therewith, and having a pipe cutting edge at a predetermined angle with said end surface of said pipe to thereby cut a predetermined bevel thereon.

2. The arrangement defined in claim 1 wherein:
said cam means is rotatably mounted on said support means for rotation about a cam axis substantially parallel to said nominal axis of said pipe.

3. The arrangement defined in claim 1 and further comprising:
means for selectively moving said cam means out of engagement with said exterior surface of said pipe.

4. The arrangement defined in claim 3 and further comprising:
second resilient means intermediate said rigid arm means and said support means for exerting a second predetermined resilient force thereon in a radially outwardly direction, and said second predetermined resilient force is different from said first predetermined resilient force.

5. The arrangement defined in claim 3 and further comprising:
adjustment means for varying said first predetermined resilient force.

6. The arrangement defined in claim 3 wherein:
said bevel cutter tool means is mounted on said support means in a predetermined axially spaced relationship to said bearing surface of said cam means.

7. The arrangement defined in claim 6 wherein:
said cam means is rotatably mounted on said support means for rotation about a cam axis substantially parallel to said nominal axis of said pipe.

8. The arrangement defined in claim 1 and further comprising:
means for selectively moving said cam means out of engagement with said exterior surface of said pipe;
second resilient means intermediate said rigid arm means and said support means for exerting a second predetermined resilient force thereon in a radially outwardly direction, and said second predetermined resilient force is different from said first predetermined resilient force; and
adjustment means for varying said first predetermined resilient force.

9. The arrangement defined in claim 8 wherein:
said bearing surface of said cam means comprises a right cylindrical surface having a predetermined axial length, and said cam means further comprises a conical surface coupled thereto wherein the axis of said conical surface of said cam means is coaxial with the axis of said right cylindrical surface.

10. The arrangement defined in claim 9 and further comprising:
a cylindrical shaft means fixedly coupled to said support means and extending axially therefrom;
bearing means mounted on said cylindrical shaft means; and
said cam means mounted on said bearing means.

* * * * *